Patented Mar. 28, 1939

2,152,485

UNITED STATES PATENT OFFICE 2,152,485

MASTER CYLINDER FOR HYDRAULIC BRAKES

Carl H. Kindl, Dayton, Ohio, assignor to General Motors Corporation, Detroit, Mich., a corporation of Delaware Application October 29, 1934, Serial No. 750,526

1 Claim. (Cl. 60—54.6)

This invention relates to fluid transmitting mechanism such as is used for applying vehicle brakes and doing other useful work. It is intended more particularly as an improvement in the master cylinder of a hydraulic brake system for vehicles.

The object of the invention is to improve the operation of the hydraulic medium in applying the brakes.

A further object consists in providing an improved master cylinder and reservoir assembly whereby the action of the hydraulic medium is improved.

Other objects and advantages will be understood from the following description.

Figures 1, 2:
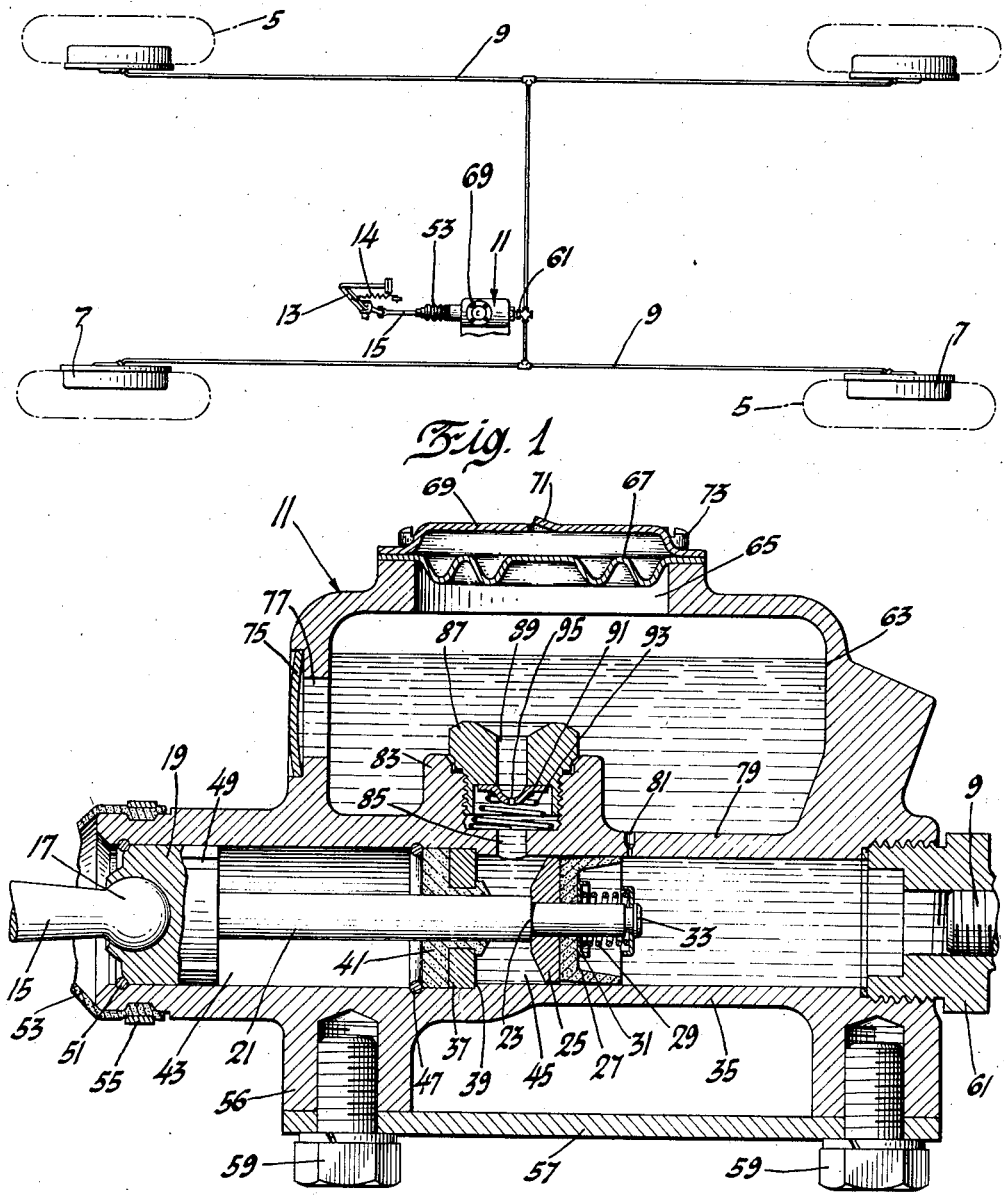
Fig. 1 is a diagrammatic view showing the relation of the master cylinder and reservoir assembly.
Fig. 2 is a view in vertical section through the master cylinder and reservoir.

Referring to the drawing, numeral 5 represents the wheels of a vehicle, each wheel having a drum 7 housing suitable expanding brake shoes, not shown. These shoes are expanded by conventional hydraulic wheel cylinders, these not being illustrated. The cylinders are operated by a fluid medium transmitted through conduits 9 which are connected to a master cylinder and reservoir assembly indicated as a whole by numeral 11. A pedal 13 normally held in released position by a spring 14 is used to push a rod 15 having a ball end 17 socketed in the enlarged head 19 on one end of a piston rod 21. On the other end of rod 21 is a shoulder 23 engaged by a disc 25 bearing against which is a cup-shaped packing 27 held against the disc by a spring 29. The spring engages abutments 31, one abutment lying against the packing 27 and the other seated in a groove and engaging a shoulder 33 at the end of the rod 21. The piston reciprocates in a cylinder 35, being guided for rectilinear movement by the head 19 as it slides in the outer end of the cylinder.

The cylinder is divided by a wall 37 engaging a shoulder 39. Together with wall 37 is a sealing closure member 41 apertured for the passage of rod 21 and so fitting the rod and cylinder wall as to prevent the passage of air or liquid between the regions 43 and 45 on opposite sides of the wall. A spring ring 47 is snapped into a groove of the cylinder to hold the parts 37 and 41 in position. The head 19 may be provided with grooves 49 to permit the free passage of air to and from chamber 43. A ring 51 is shown seated in a groove in the end of the cylinder. This ring serves to prevent the escape from the cylinder of the head 19. A dust protecting boot 53 is secured to the end of the cylinder by fastening means 55 and to the rod 15 in any convenient manner. The cylinder is formed with lugs 56 adapted to engage a vehicle part 57 to which it is secured by fastening means 59. The end of conduit 9 adjacent the assembly 11 is secured to a fitting 61 threaded in the end of the cylinder 35.

Formed integrally with the cylinder is a reservoir 63. The reservoir has an opening at 65 covered by a foldable diaphragm 67, which diaphragm is clamped under a cover 69 having an air vent 71 and secured by fastening means 73. The drawing also shows a plug 75 covering an opening 77. The wall 79 between cylinder 35 and reservoir 63 is provided with a suitable compensating opening 81. This opening is uncovered by the piston when in its retracted position as shown in Fig. 2. The separating wall is also formed with an apertured boss 83 from which a passage 85 leads to the region 45 between the piston and the wall 37. A cap 87 is threaded into the boss. It is apertured as at 89. Within the cap is a valve 91 so positioned as to close the opening 89 by a spring 93. The valve 91 is provided with a small compensating aperture 95.

The operation of the system provided with this novel assembly is as follows:

Fig. 2 represents the parts in the position they occupy when the brakes are released, any tendency to unequal pressure conditions between the cylinder chambers and the reservoir being compensated by the apertures 81 and 95. When the pedal is depressed, the piston moves to the right and at once covers opening 81. The hydraulic medium is forced out through the conduit 9 to the several wheel cylinders where it acts upon the pistons of the wheel cylinders to expand the shoes into contact with the wheel drums. In so moving, air from chamber 43, which chamber is being reduced in capacity, may escape through slots 49. The sealing wall 41 functions to prevent any transference of fluids between chambers 43 and 45. To prevent the development of suction in chamber 45 as the piston 25 moves forwardly, valve 91 opens and the hydraulic medium from the reservoir 63 enters the chamber 45 and keeps it filled. Subsequent to brake application, pressure on the pedal is relieved and spring 14 restores it and the piston to its brake release position. In doing so it may move the piston too rapidly for the fluid from the brake cylinders to keep the cylinder 35 filled, resulting in a tendency to create a vacuum in chamber 35. In the absence of any provision to prevent this vacuum the chamber will not be filled until the brake releasing springs restore the pistons of the wheel cylinders to their released position. This vacuum, however, may in the meantime cause air to enter the wheel cylinders and adversely affect the subsequent operation of the brake. To prevent any such faulty operation it will be noted that in the present device the space 45 has been filled with fluid from the reservoir in the forward stroke of the piston and that this space is being reduced in capacity by the retracting movement of the piston. There will therefore be a fluid flow from this space 45 around the piston to chamber 35 to break the vacuum because the only other escape—95—offers considerable resistance and is unable to permit the ready escape of the trapped fluid.

The device may be used as a pump in the event that there is a lack of hydraulic medium in the system. Suppose, for example, the pedal reaches the floor before the brake shoes engage the drum owing to a lack of hydraulic medium. The foot may be lifted from the pedal. Its spring 14 will then reversely rotate the pedal, thereby pulling back the piston. It may be then pushed forward again by the foot to apply the brakes, the pedal no longer reaching the floor. In the retracting movement of the piston some of the hydraulic medium reenters chamber 35 from the conduit; some passes the piston cup 27 from chamber 45 to chamber 35; and a little is restored to the reservoir through aperture 95. The space 35 is thus replenished from chamber 45 as well as from the conduit 9 and the wheel cylinders because the backward flow of the medium through the conduit 9 toward chamber 35 influenced by the brake releasing springs is supplemented by the tendency to build up pressure in chamber 45 and deliver the hydraulic medium from chamber 45 to chamber 35. The subsequent pressure on the piston then operates against a greater quantity of the medium in the system and the brakes are applied before the pedal reaches the floor. When the brakes are to be released the piston moves to the left and the chamber 35 is again filled, the filling being accomplished in part by the passage of the medium around the piston from chamber 45 as before. When the piston is fully retracted as in Fig. 2, the shoe releasing springs force back the excess medium to the master cylinder and out through compensating opening 81 to the reservoir. It will be seen that the head 19 guides the piston for rectilinear motion but that the chamber 43 is always subject to atmospheric pressure only and has no function in connection with the operation of the transmission of the medium as does chamber 45.

It is a matter of importance that the flow of the medium should be partly from chamber 45 to chamber 35 when the piston is being retracted whether for the purpose of pumping up the system or for releasing the brakes for the reason that otherwise the tendency to create suction in chamber 35 might cause air to leak into the system at the wheel cylinders, which air would obviously interfere with the action of brake application. Some known constructions have attempted to overcome this difficulty by providing retarding means in the conduit to check the return flow of the hydraulic medium. Any such retarding means obviously adds to the resistance to be overcome when applying the brakes. I find that it is better to use the construction comprising the sealed wall 41 together with the valve 91, which constructions cooperate to tend to exert positive pressure to supply the chamber 35 from chamber 45 as the piston moves toward the rear. In this way no suction is developed in chamber 35 such as might cause an inflow of air at the wheel cylinders of the system. To whatever extent the retracting movement of the piston exceeds the return movement of the hydraulic medium, to that extent the medium is supplied to region 35 by a flow around the piston. The pressure in chamber 45 caused by the spring 14, additional to that required to prevent the development of suction in chamber 35, causes a gradual discharge of the hydraulic medium through aperture 95. This has the added function of checking a too rapid return of the pedal to its released position.

I claim:

In a hydraulic brake system, a master cylinder, a piston slidable within said cylinder, a head reciprocable in one end of said cylinder, a rod connecting said head and piston, sealing means secured in said cylinder between said head and piston, said rod slidable through said sealing means, said cylinder having a discharge outlet at its other end, a reservoir integral with said cylinder, a restricted opening between said reservoir and cylinder at that part of the latter corresponding with the retracted position of the piston, said cylinder having a boss integral therewith and projecting into the reservoir, a valve controlled passage in said boss affording communication between the reservoir and that part of the cylinder between the piston and the sealing means, and means engaging said head to reciprocate said head and piston.

CARL H. KINDL.